United States Patent [19]

Erickson et al.

[11] 4,416,936
[45] Nov. 22, 1983

[54] NONWOVEN FABRIC AND METHOD FOR ITS PRODUCTION

[75] Inventors: Wayne K. Erickson; Lewis R. Mulligan, both of Seneca, S.C.

[73] Assignee: Phillips Petroleum Company, Bartlesville, Okla.

[21] Appl. No.: 334,507

[22] Filed: Dec. 28, 1981

Related U.S. Application Data

[63] Continuation of Ser. No. 170,305, Jul. 18, 1980, abandoned.

[51] Int. Cl.³ ............................................. B32B 27/00
[52] U.S. Cl. ....................................... 428/286; 28/107; 28/111; 28/240; 156/148; 428/284; 428/296; 428/297; 428/298; 428/299; 428/300; 428/303
[58] Field of Search ............... 428/286, 287, 297, 298, 428/299, 300, 303, 296, 284; 156/148; 28/107, 111, 240

[56] References Cited

U.S. PATENT DOCUMENTS

| | | | |
|---|---|---|---|
| 2,277,049 | 3/1942 | Reed | 428/280 |
| 2,318,670 | 5/1943 | Carruthers et al. | 264/122 |
| 2,840,881 | 7/1958 | Bateman | 428/234 |
| 3,448,502 | 6/1969 | Tesch | 28/111 |
| 3,452,128 | 6/1969 | Rains | 264/126 |
| 3,473,205 | 10/1969 | Zocher | 28/107 |
| 3,615,989 | 10/1971 | Pepoe | 156/148 |
| 3,873,388 | 3/1975 | Hunter | 156/148 |
| 3,941,530 | 3/1976 | Platt | 28/111 |
| 4,035,543 | 7/1977 | Draper et al. | 428/300 |
| 4,042,655 | 8/1977 | Platt et al. | 28/107 |
| 4,154,889 | 5/1979 | Platt | 428/300 |
| 4,205,113 | 5/1980 | Hermansson | 428/300 |

Primary Examiner—James J. Bell

[57] ABSTRACT

A multi-layer nonwoven fabric is provided comprising at least one layer of waste fibers positioned between layers of virgin synthetic fibers joined by, for example, needle punching. A process for producing the fabric comprises the steps of forming a base web of virgin staple fibers, adding a second web of waste fibers, adding a top web of virgin staple fibers, and consolidating the webs as by needle punching to form a composite fabric.

24 Claims, 1 Drawing Figure

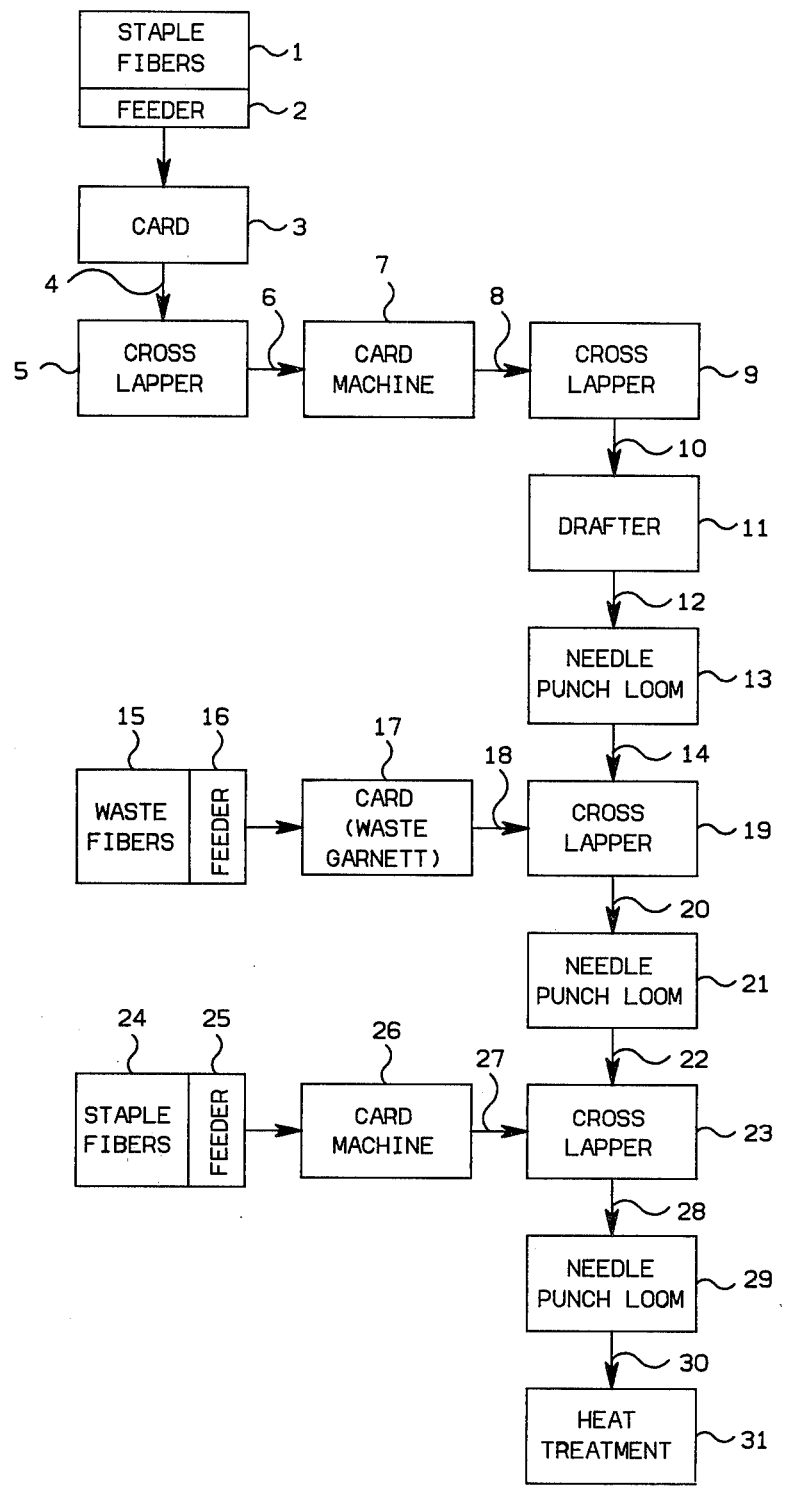

NONWOVEN FABRIC AND METHOD FOR ITS PRODUCTION

This is a continuation of application Ser. No. 170,305, filed July 18, 1980, now abandoned.

BACKGROUND OF THE INVENTION

The invention relates to a nonwoven fabric and a method for making it. It further relates to a method for using scrap synthetic and natural fibers.

Nonwoven fabrics, which can be made relatively inexpensively by a variety of methods, are widely used in applications requiring a lowcost, durable material. The production of nonwoven fabrics could be made even more economical if uses could be found for the scrap fabric and waste fibers normally resulting from the process. One form of scrap material it would be particularly desirable to use productively is the material, called selvage, which is trimmed from each edge of the nonwoven fabric before the fabric is used commercially. Other scrap material, such as waste fibers, are often sold at distressed prices because of the lack of suitable uses for the fibers in conventional nonwoven fabrics. Such waste fibers and shredded selvage material are inferior fibers for making conventional high quality nonwoven fabrics, although waste fibers can be formed into webs or thin fabrics, which are usually then chemically bonded by such methods as dispersing polyethylene powder in the web and then curing.

It is therefore an object of this invention to provide an economical, strong synthetic fabric.

It is another object of this invention to provide a use for waste synthetic and natural fibers.

SUMMARY OF THE INVENTION

According to the invention, a nonwoven fabric comprises a layer of virgin synthetic staple fibers, an intermediate layer formed at least in part of waste staple fibers, and an upper layer of virgin synthetic staple fibers joined together so as to form a composite fabric. The composite fabric is preferably made by a process comprising the steps of forming a bottom web of virgin staple fibers which is then warp stretched and needle punched, adding a second web comprising waste fibers, needle punching the two layers, adding a third web of virgin staple fibers, and joining the three layers, preferably by needle punching, to form a composite fabric. The fabric can then be heat treated as desired. The middle layer can be formed from waste fibers having a variety of staple lengths, thus providing a use for scrap material.

BRIEF DESCRIPTION OF THE DRAWING

The FIGURE is a schematic representation of a process for making nonwoven fabric according to the invention.

DETAILED DESCRIPTION OF THE INVENTION

The invention fabric is a nonwoven multilayer synthetic fabric having at least one layer of fibers which can comprise waste fibers positioned between layers of synthetic staple fibers. The fabric can comprise any number of layers, with layers of waste fibers preferably positioned between layers of virgin synthetic fibers. For simplicity, the fabric will more particularly be described herein in terms of a single waste fiber layer positioned between virgin synthetic fiber layers.

The outer layers are formed from staple fibers generally having a staple length of about 2 to $3\frac{1}{2}$ inches, although staple fibers ranging in length from about $1\frac{1}{2}$ to 10 inches are suitable. Staple denier can be selected from a wide range of deniers. Denier can range from about 1 to about 60, but deniers in the range of about 1.5 to about 18 are more common, and a denier within the range of 1.5 to 4.5 is particularly suitable for the fabric of the outer layers.

The outer layers can be made from any synthetic material which can be formed into staple fibers. Among such materials commonly available are polyolefins such as polymers of ethylene, propylene, butene and copolymers of these, polyesters such as polyethylene terephthalate, polyamides such as nylon-6,6, halogenated vinyl polymers such as polyvinyl chloride, polyacrylics, and mixtures of synthetic fibers. Polypropylene has been used to produce an economical, strong material for the outer layers. Each outer layer can be fused on one or both sides if desired or left unfused. The outer layers will usually be formed from virgin staple fibers of relatively consistent length and quality. A typical outer layer would be formed from about $3\frac{1}{4}$ inch by about 3 denier polypropylene staple fiber. As used herein, the term "virgin synthetic fibers" are staple fibers suitable for but not previously used in a fabric.

The intermediate layer can be formed from a wide variety of waste or off-quality fibers. As used herein, the term "waste fibers" includes but is not limited to such scrap material as fibers which have been recovered from fabric such as by shredding selvage strips, small masses of entangled short fibers, short fused spots from fabric heat-treating processes, and other fibers which are unsuitable for forming into first-quality fabric. The waste fiber can be a mixture of short pieces of material and staple fibers of any length. The waste fibers can be from woven or nonwoven fabrics. The fibers of this layer can be made of any synthetic material which can be formed into fibers, including polyolefins, polyesters, polyamides and mixtures of such synthetic fibers and can include natural fibers such as cotton or wool. The preferred material for the middle or intermediate layer would most commonly be the waste material from the fabrics of the same manufacturing plant using the invention described herein. For example, a manufacturing plant producing woven or nonwoven fabrics from polypropylene fibers will have waste fibers of that material. A typical middle layer for such a fabric would contain waste fibers having a denier or mixed deniers of from about 1 to 18. Usually these fibers will be of varied lengths from 0.25-inch to about 3 inches, crimped and colored.

The three layers can be consolidated by any suitable means such as needle-punching, stitch-bonding, fusing, or chemical bonding. The consolidation can be accomplished by depositing each layer in the form of a carded web and then needle-punching the three layers together. Preferably, the first layer is needle-punched, the second layer is deposited thereon and the two layers are needle-punched together before the third layer is deposited thereon, followed by a needle-punching operation to join all three layers. Optionally, the third layer can be needle-punched prior to being deposited on previously consolidated first and second layers followed by a needle-punching operation to join all three layers.

The process of the invention can be best described by reference to the FIGURE, which provides a schematic representation of a process suitable for making the nonwoven fabric of the invention.

The first step is to form a base layer of staple fibers. Staple-length fiber 1 such as polypropylene staple is fed by feeding means 2, such as bale breakers, blender boxes or feed boxes, to carding machine 3. The carding process produces a fibrous structure or web 4. The carded web is fed, for example onto a conveyor belt or apron, to crosslapper 5, where lapper aprons crosslap the carded web by traversing a carrier means such as an intermediate apron in a reciprocating motion, to produce a batt the fibers 6 of which are oriented primarily in the transverse direction. The number of laps used to form the batt depends upon several variables such as the desired weight of the base layer, the weight of the web, and the amount of drafting the batt is to undergo in the process. The formed batt 6 may, if desired, be subjected to an additional carding step 7, after which the twice-carded web 8 would be crosslapped by crosslapper 9 to form a batt 10 in a similar manner.

Batt 10, or batt 6 if the optional second carding and crosslapping operations are not employed, is fed to wrap-drafting means 11 comprising one or more sets of nip rolls used to draft, or stretch, the batt in the warp or longitudinal direction. Depending upon the material being used, its staple length and denier, staple finish, degree of crimp, and weight of the batt, from one to six sets of nip rolls are used having an overall draft ratio ranging from about 1.01 to 1 to about 4 to 1 and a maximum draft ratio between sets of nip rolls of 2 to 1.

The warp-drafted batt 12 is then passed to needle-punch loom 13 where the batt is needle-punched at a density in the range of 100 to 1000 punches per square inch and at a penetration through the fabric of from about ¼-inch to about ¾-inch depending on the thickness of the fabric.

The warp-drafted, needled batt 14 then serves as a base layer on which waste fibers are deposited to form the intermediate layer of the fabric. The fiber chosen for this intermediate layer will depend upon the properties and uses desired for the finished fabric. It is preferred to use waste fibers such as shredded fabric trim, which provides a use for fiber which would otherwise be disposed of at depressed prices and allows the production of a relatively inexpensive fabric.

The waste fibers 15 for the intermediate layer are fed by feeder means 16 to card 17, which can be a garnett machine if selvage material or other waste is used for the intermediate layer card 17 arranges the fibers in a web 18 which is then fed to crosslapper 19, where the intermediate web is crosslapped over the base layer 14.

Batt 20 comprising the base layer and the intermediate layer thereon can then be fed to needle-punch loom 21 where the two layers are needle-punched as previously described together to form an integral two-layer web 22.

The needled, two-layer web 22 is then passed under crosslapper 23, where the top layer comprising staple fibers 24 which has been fed by feeding means 25 to card 26 to form a carded web 27, is deposited onto the two-layer batt. The staple fibers comprising this top layer can be selected from the same materials suitable for forming the base layer, and the top layer and the base layer can be the same or different materials. The length of this staple fiber should be at least about 2 inches in length and is preferably about 2 to 3½ inches in length. This top layer 27 is crosslapped over the two-layer batt, thus forming a three-layer mat 28 which is passed to needle-punch loom 29 for needling as previously described to produce an integral three-layer fabric 30.

The two-layer mat or the three-layer mat can be, if desired, drafted in the warp direction at appropriate times during the preparation of the fabric.

The three-layer fabric 30 can be used without further treatment or, if desired, passed to heat treatment in 31, which can comprise one or more heated rolls or other heating means such as infrared heaters. The fabric can be heated on one or both sides by infrared heating, roll heating, or any combination of these or other heating methods. The heating means will preferably be operated so as not to fuse the fibers of the intermediate layer but to selectively fuse only fibers on one or both outer layers. The heat treatment could be performed on one or both sides of the base layer prior to laying the middle and upper layers, but is conveniently performed on the finished three-layer fabric. Following consolidation or heat treatment, if used, the fabric is usually rolled on storage rolls or cut to lengths.

The three-layer fabric of the invention can be used in applications requiring a low-cost nonwoven fabric such as carpet backing or upholstery padding, or the material can be used to make economical or disposable blankets.

For example, a fabric according to the invention was made comprising three layers. The base layer and top layer were made from a first fabric that was prepared by using polypropylene virgin staple fibers 3.2 denier, 3¼" long, carding the staple fibers to form a web, feeding the thus formed web to a crosslapper to provide additional thickness, stretching the web in a warp direction at a ratio of about 1.2/1, and needle punching the stretched web with single-barb needles at a density of about 300 punches/sq. inch. The material formed for the base layer and the top layer was a nonwoven web of 2.3 oz/yd$^2$. A portion of this web was cut to fit a 36" wide conveyor on a nonwoven fabric processing line and served as the carrier for the intermediate layer of mixed 3,4,6, and 18 denier waste fibers of varied length to about 3¼", which was formed into a web by carding the waste fibers and crosslapping the formed web over the carrier fabric. A top layer of the first material was added to the crosslapped web and carrier web prior to needle punching with six-barb needles at a density of about 300 punches/sq. inch to consolidate the fabric.

We claim:
1. A nonwoven fabric comprising
   (a) a first layer formed substantially of synthetic virgin staple fibers;
   (b) a second, intermediate layer comprising waste fibers; and
   (c) a third layer formed substantially of nonwoven staple fibers, the first, second and third layers being consolidated so as to form an integral, layered fabric.
2. The nonwoven fabric of claim 1 in which the first, second and third layers are consolidated by needle punching.
3. The nonwoven fabric of claim 1 in which a major portion of the staple fibers of the first layer and the third layer are at least about 2.0 inches in length.
4. The nonwoven fabric of claim 3 in which the major portion of the staple fibers of the second layer are less than about 2.5 inches in length.

5. The nonwoven fabric of claim 1 in which the second layer comprises fibers recovered from a nonwoven fabric.

6. The nonwoven fabric of claim 5 in which the staple fibers of the second layer are about 3 denier.

7. The nonwoven fabric of claim 1 in which the second layer comprises waste natural fibers.

8. The nonwoven fabric of claim 1 in which the second layer comprises waste synthetic fibers.

9. The nonwoven fabric of claim 8 in which fibers on at least one surface of the nonwoven fabric have been heat-treated by fusing without fusing the majority of the fibers of the second layer.

10. The nonwoven fabric of claim 1 in which fibers of the first, second and third layers are intertwined to provide consolidation of the layers.

11. The nonwoven fabric of claim 1 in which a major portion of the staple fibers of the first and third layers are polypropylene fibers.

12. The nonwoven fabric of claim 11 in which the second layer comprises waste polypropylene fibers.

13. A method for forming a nonwoven fabric comprising the steps of
    (a) forming a first web comprising carded virgin synthetic staple fibers;
    (b) forming a second web comprising carded waste staple fibers;
    (c) depositing the second web on the first web;
    (d) forming a third web comprising virgin staple fibers;
    (e) depositing the third web on the second web;
    (f) joining the first, second and third webs so as to form a three-layer nonwoven fabric.

14. The process of claim 13 in which the first, second and third webs are joined by needle punching.

15. The method of claim 13 further comprising the step of stretching the first web in the warp direction prior to step (c).

16. The method of claim 15 further comprising the step of needle punching the stretched first web prior to step (c).

17. The method of claim 16 in which the first, second and third webs are joined by needle punching.

18. The method of claim 17 further comprising the step of needle-punching the first web and second web together so as to form a two-layer needled web prior to depositing the third web thereon.

19. The method of claim 18 further comprising the step of heat treating by fusing fibers on at least one surface of the three-layer needled web.

20. The method of claim 19 in which the second web is crosslapped over the first web and the third web is crosslapped over the two-layer needled web.

21. The method of claim 20 in which the second web comprises scrap synthetic fibers.

22. The method of claim 21 in which the second web is formed from garnetted edge trim from a synthetic fabric.

23. The method of claim 22 in which the lengths of the staple fibers of the first web and the third web are within the range of about 2 to about 3½ inches and the staple denier is within the range of about 1.5 to 4.5, and the staple denier of the second web is within the range of about 1 to about 18.

24. The method of claim 13 in which the third web is formed by carding synthetic staple fibers and needle-punching the thus formed carded web.

* * * * *